March 5, 1935. A. E. SMITH 1,993,629
SYRINGE AND AMPULE THEREFOR
Filed Feb. 9, 1932 2 Sheets-Sheet 1
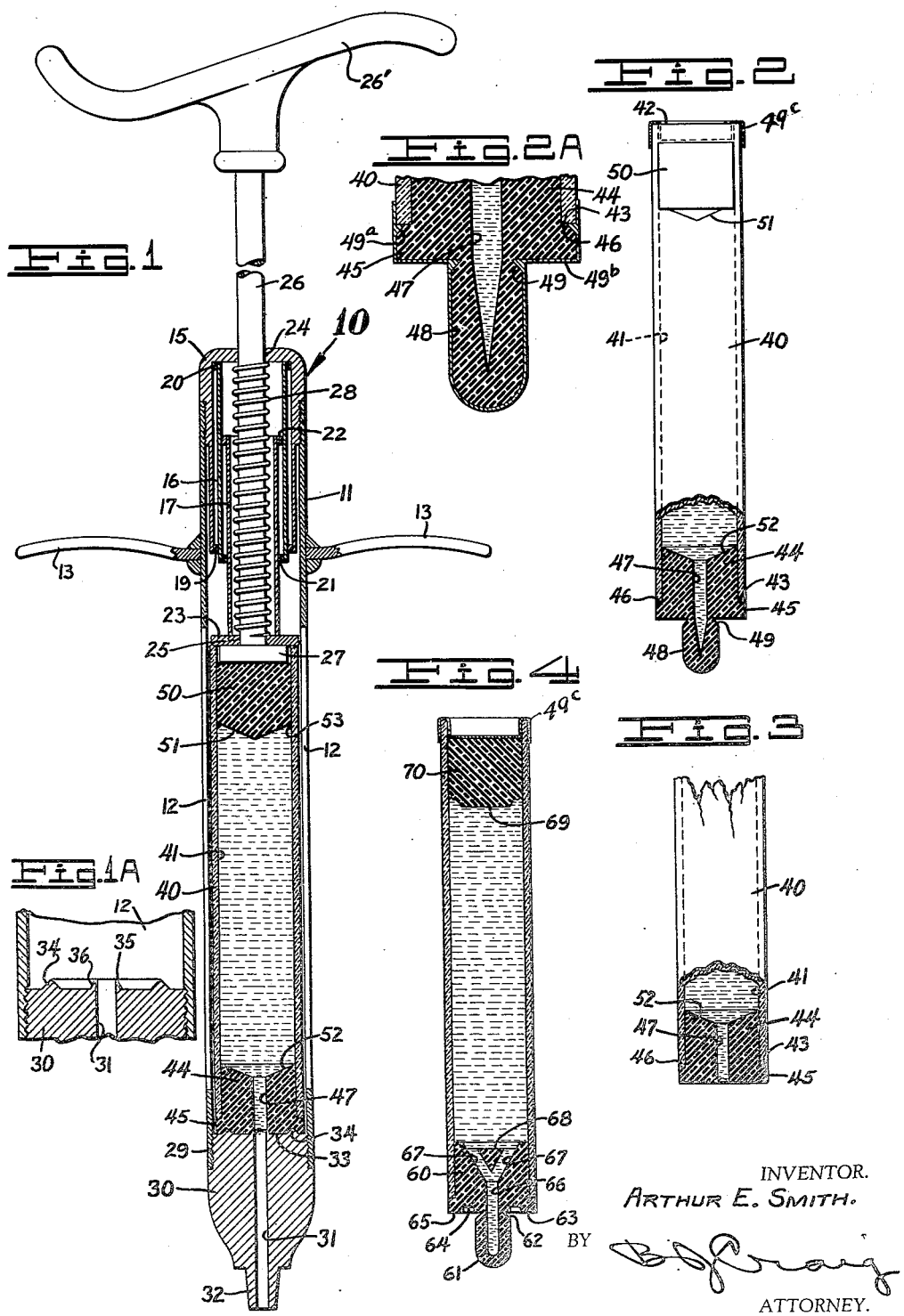
INVENTOR.
ARTHUR E. SMITH.
BY
ATTORNEY.

March 5, 1935.  A. E. SMITH  1,993,629
SYRINGE AND AMPULE THEREFOR
Filed Feb. 9, 1932   2 Sheets-Sheet 2
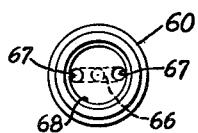
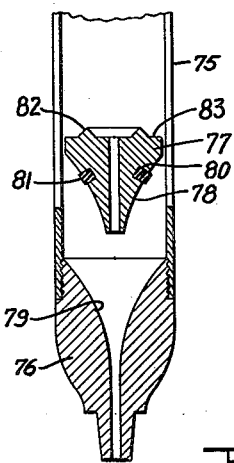
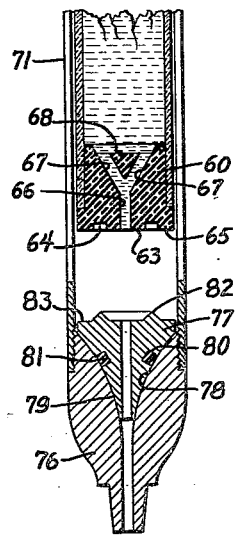
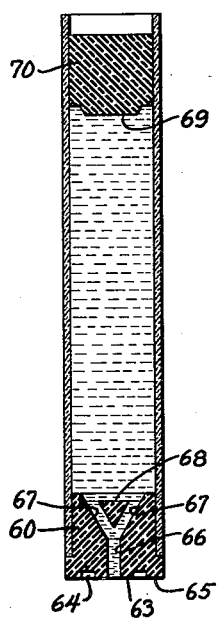
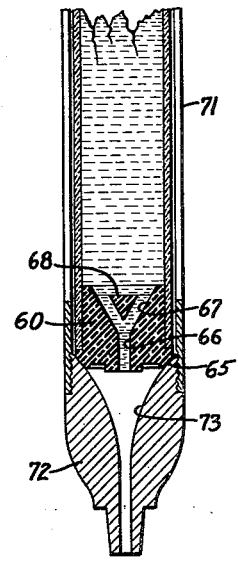
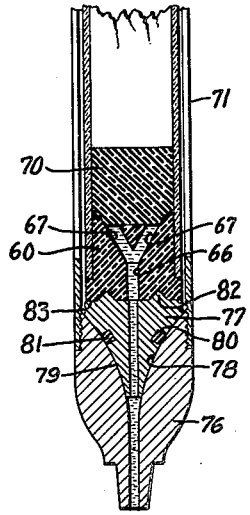
INVENTOR.
ARTHUR E. SMITH.
BY 
ATTORNEY.

Patented Mar. 5, 1935

1,993,629

UNITED STATES PATENT OFFICE 1,993,629

SYRINGE AND AMPULE THEREFOR

Arthur E. Smith, Los Angeles, Calif.

Application February 9, 1932, Serial No. 591,825

2 Claims. (Cl. 128—218)

This invention relates to syringes.

The general object of the invention is to provide a syringe wherein a barrel member is employed and wherein an ampule of any desired size may be inserted in the barrel member and wherein the barrel includes novel means for coacting with a portion of the ampule through an interposed rubber member whereby a fluid tight seal is provided.

A further object of the invention is to provide a syringe including a front member having a raised circumferential sealing bead thereon which is adapted to engage the end of the cork in an ampule to provide a sealing joint.

A further object of the invention is to provide a syringe barrel for use with square ended ampules, wherein the barrel is provided with a removable adapter so constructed and arranged that it may coact to produce a fluid tight joint with a tapered ampule.

Another object of the invention is to provide a novel ampule closure for use in the ampules of ampule syringes.

Other objects of the invention will be apparent from the following description taken in connection with the accompanying drawings, wherein:

Fig. 1 is a central sectional view through a syringe embodying the features of my invention.

Fig. 1A is an enlarged fragmentary section of the syringe front end member and an ampule end.

Fig. 2 is a side elevation of one type of ampule which may be used with the syringe shown in Fig. 1.

Fig. 2A is an enlarged fragmentary view of the front end of the ampule shown in Fig. 2.

Fig. 3 is a view similar to Fig. 2, with the seal removed.

Fig. 4 is a fragmentary central sectional view showing a slightly modified form of ampule closure.

Fig. 5 is an end view of the modified closure.

Fig. 6 is a view similar to Fig. 4 showing the seal removed.

Fig. 7 is a fragmentary sectional view showing a further use of my ampule closure.

Fig. 8 is a view similar to Fig. 7 showing my adapter being inserted.

Fig. 9 is a view similar to Fig. 8 showing the adapter in place and showing an ampule being moved to operative position, and Fig. 10 is a view similar to Fig. 9 showing the ampule in place.

Referring to the drawings by reference characters I have shown my invention as embodied in a syringe indicated generally at 10. As shown the syringe comprises a barrel 11, which is preferably made of metal and is provided with viewing apertures 12 near one end thereof. The barrel is provided with finger grips 13, which may be held in place in any suitable manner. The rear end of the barrel is threaded as at 14 to receive a cap or end member 15. This cap is provided with a downwardly directed sleeve 16 in which other sleeves 17 and 18 are telescopically fitted. The sleeves are provided with shoulders 19, 20, 21 and 22 to prevent the parts from becoming entirely separated.

Arranged on the inner sleeve 18, I fasten a head 23. The cap 15 is apertured as at 24 and the head 23 is apertured as at 25 and through these apertures a plunger 26 extends. The plunger 26 is provided with a head 27 and a spring 28 surrounds the plunger and normally urges the head 23 downwardly. The spring 28 is of such nature that it does not interfere with the movement of the plunger 26. The plunger 26 is provided with an operating handle 26' which may be of any desired character.

The front end of the barrel is threaded as at 29 to receive a front member 30 which has a central aperture 31 therethrough and has a reduced portion 32 to receive a hypodermic needle. The head 30 is provided with a plane upper face 33 and from this face a bead 34 projects. This bead 34 is preferably sharpened for a purpose to be presently described.

Projecting upwardly from the surface 33 and surrounding the aperture 31 I provide a flange 35, the inner wall of which is a continuation of the side walls of the aperture 31 and the outer wall of which is beveled as at 36 (see Fig. 1A).

I now prefer to use an ampule as shown in the accompanying drawings in combination with my new syringe.

As shown in Figs. 2 and 3 this ampule comprises a cylindrical body 40 which has a cylindrical inner wall 41 and which is made of a grade of glass which will not affect or be affected by the contents of the ampule. The ampule has ends 42 and 43 which are at right angles to the axis of the ampule and the front end of the ampule is closed by a closure member 44 which is preferably made of a suitable grade of rubber and includes a cylindrical portion fitted in the barrel and a flange portion 45, the outer diameter of which corresponds to the outer diameter of the ampule 40 and the rear shoulder 46 of which engages the end of the ampule.

The closure 44 is provided with an aperture 47 which is open at one end and is closed at the other end by a seal 48 which is made of rubber and which is integral with the closure 44. Within the seal 48 the aperture 47 is preferably tapered as shown in Fig. 2. The seal is provided with a V-notch 49 which serves as a guide in cutting off the seal 48 and this notch assures that when the seal 48 is removed the entire end of the ampule will be plane.

The outer edge of the rear shoulder 46 of the closure 44 is preferably beveled as at 49ª. After the closure member 44 is positioned in the ampule the closure member and a portion of the ampule body 40 is treated with hot wax to form an air and moisture tight seal over the closure member as indicated at 49ᵇ in Fig. 2A. When the closure member 44 is thus treated the wax enters the groove formed between the tapered shoulder at 49ª of the stopper and the end 43 of the ampule thereby forming a lock which aids in preventing accidental dislodgement of the wax. Wax is also applied at 49ᶜ to seal the other end of the ampule.

The wax preferably comprises 12 parts of gum dammar, 84 parts of white resin and 48 parts of white beeswax. This compound thoroughly seals the pores of the rubber cork and forms an elastic film which tightly adheres to the glass of the ampule and will not pull loose therefrom. The wax will not crack or flake and hence a permanent seal is secured. This seal remains tight at all temperatures between 40° F. and 120° F.

The ampule is provided with a piston or cork 50 which is moved forward in the ampule to expel the contents thereof. The front end of the cork 50 is provided with a conical face 51 which is complementary to the face 52 on the end of the closure 44 and as a result the entire contents will be discharged from the ampule body when the cork or piston is moved to its extreme position. The cork 50 is provided with a fin or flared edge 53 to make a tight seal along the wall of the ampule.

In use the cap 15 of the barrel is removed. The seal 48 is then cut off with a pair of scissors or knife and the ampule is inserted in the barrel 11. The closure 15 is then placed in position and the head 23 urged by the spring 28 pushes the ampule forwardly so that the annular seal member 34 in the front member 30 engages the face of the closure 44 and forms a tight seal. The handle 26' may then be actuated to force the plunger 26 forward and thus cause the cork 50 to force the contents from the ampule.

As the ampule closure 44 moves into engagement with the end member 30 the flange 35 of the end member enters the aperture 31 of the closure 44 and prevents the end of the aperture 31 from becoming squeezed together when pressure is applied to the cork 50.

In Fig. 4 I show a slight modification of my invention, wherein the ampule is provided with a closure 60 which has a seal 61 integral therewith. The seal is notched as at 62 as previously described. The plane end face 63 of the closure 60 is provided with a circumferential groove 64 which provides an annular ring of rubber 65, the purpose of which will be presently described. The closure 60 is provided with a central aperture 66 and with a pair of lateral apertures 67 which intersect the central aperture 66. The central portion of the closure 60 is depressed as at 68 to receive a depressed portion 69 on a cork 70 as shown in Fig. 6. The closure member 60 is preferably provided with a wax seal similar to the seal 49ᵇ shown in Fig. 2A.

In Fig. 7 I show a syringe including a barrel 71 and a front member 72. This front member 72 has a conical recess 73 therein and when an ampule such as shown in Fig. 4, just described, is placed in the barrel 71 and the ampule urged forward by a device similar to that shown in Fig. 1, the annular ring 63 on the ampule will be forced into engagement with the front member 73 as shown in Fig. 7, and thus a tight engagement is secured. The ampule shown in Fig. 4 is also adapted for use in the syringe shown in Fig. 1, since this ampule has a plane front face when the seal 61 is removed.

In Figs. 8, 9 and 10 I show a modification of my invention wherein the barrel 75 is provided with a front member 76 and this front member is engaged by an adapter 77 which has a conical wall 78 which corresponds to the wall 79 of the front member 76. The adapter is provided with a groove 80 in which a gasket 81 is positioned so that a tight seal is secured between the adapter 77 and the front member 76. The adapter is preferably provided with an annular sharpened bead 82 similar to the bead 34 previously described and the adapter has a plane upper face 83 for engagement with the closure member 60. This closure member may have the grooves 64 which are in line with the bead 82 as shown, or the closure may have the plane end as shown in the ampule in Fig. 2.

From the foregoing description it will be apparent that I have invented a novel form of ampule and syringe wherein a square ended ampule is provided with a square ended closure and wherein a tight seal is maintained at all times during the operation of making an injection and wherein the ampule contents are preserved in good condition and wherein the ampule is very quickly prepared for use.

Having thus described my invention, I claim:

1. An ampule comprising a hollow glass member, a closure mounted in the end of said ampule, said closure being made of rubber and including a portion fitted within the ampule and a shoulder on said portion engaging the end of the ampule, the outer edge of said shoulder being beveled to form in conjunction with the adjacent end of said cylinder a peripheral groove, the exposed portion of said closure and a portion of the front end of said ampule having a wax coating thereover, a portion of said wax coating being positioned in said peripheral groove.

2. An ampule comprising a hollow glass member having one end arranged at right angles to the axis thereof, a closure mounted in the said one end of said ampule, said closure being made of rubber and fitted within the ampule and having a shoulder engaging the end of the ampule, the outer edge of said shoulder being beveled to form in conjunction with the adjacent end of said cylinder a peripheral groove, said closure having a recess therein terminating in a discharge aperture, the front end of said closure being reduced and including an integral sealing cap which is hollow and communicates with said aperture, said sealing cap being adapted to be severed from said closure, said closure and its sealing cap and a portion of the front end of said ampule having a wax coating thereover, a portion of said wax coating being positioned in said peripheral groove.

ARTHUR E. SMITH.